(12) United States Patent
Voth

(10) Patent No.: US 7,825,925 B2
(45) Date of Patent: Nov. 2, 2010

(54) METHOD AND SYSTEM FOR REPAIRING TRIANGULATED SURFACE MESHES

(75) Inventor: Eric Jon Voth, Maplewood, MN (US)

(73) Assignee: St. Jude Medical, Atrial Fibrillation Division, Inc., St. Paul, MN (US)

( * ) Notice: Subject to any disclaimer, the term of this patent is extended or adjusted under 35 U.S.C. 154(b) by 689 days.

(21) Appl. No.: 11/715,922

(22) Filed: Mar. 9, 2007

(65) Prior Publication Data

US 2008/0218509 A1 Sep. 11, 2008

(51) Int. Cl.
*G06T 15/00* (2006.01)

(52) U.S. Cl. ............... 345/419; 345/421; 345/428; 345/619; 382/254

(58) Field of Classification Search ........... 345/419, 345/421, 428, 619; 700/29; 382/254
See application file for complete search history.

(56) References Cited

U.S. PATENT DOCUMENTS

| | | | |
|---|---|---|---|
| 4,721,114 A | 1/1988 | Dufault et al. | |
| 4,785,399 A | 11/1988 | Evans et al. | |
| 5,275,164 A | 1/1994 | Maeda et al. | |
| 5,662,108 A | 9/1997 | Budd et al. | |
| 5,697,377 A | 12/1997 | Wittkampf | |
| 5,954,665 A | 9/1999 | Ben Haim | |
| 5,983,126 A | 11/1999 | Wittkampf | |
| 6,075,871 A | 6/2000 | Simanovsky et al. | |
| 6,226,542 B1 | 5/2001 | Reisfeld | |
| 6,640,119 B1 | 10/2003 | Budd et al. | |
| 6,658,279 B2 | 12/2003 | Swanson et al. | |
| 6,728,562 B1 | 4/2004 | Budd et al. | |
| 6,939,309 B1 | 9/2005 | Beatty et al. | |
| 6,947,785 B1 | 9/2005 | Beatty et al. | |
| 6,968,299 B1 * | 11/2005 | Bernardini et al. | 703/2 |
| 6,978,168 B2 | 12/2005 | Beatty et al. | |
| 6,990,370 B1 | 1/2006 | Beatty et al. | |
| 6,996,505 B1 * | 2/2006 | Edelsbrunner et al. | 703/2 |
| 7,076,300 B1 | 7/2006 | Kroll et al. | |
| 7,272,264 B2 * | 9/2007 | ElShishiny et al. | 382/254 |
| 7,283,133 B2 * | 10/2007 | Loop | 345/421 |

(Continued)

OTHER PUBLICATIONS

Jianning Wang et al. "A Hole-Filling Strategy for Reconstruction of Smooth Surfaces in Range Images", IEEE, 2003.*

(Continued)

*Primary Examiner*—Kimbinh T Nguyen
(74) *Attorney, Agent, or Firm*—Wiley Rein LLP

(57) ABSTRACT

A method of repairing a three dimensional surface mesh model to be watertight and manifold generally includes identifying a plurality of hole edges in the surface mesh model, selecting one of the hole edges, creating a cycle of hole edges that defines a hole in the surface mesh model, converting the cycle of hole edges into two or more cycles of exactly three edges each, and adding a triangular facet to the surface mesh model for each of the cycles of exactly three edges. The process may be repeated until the model is substantially watertight. Non-manifold vertices may be repaired by selecting a vertex of the model, identifying a number of independent cycles of triangular facets sharing the selected vertex, and redefining the selected vertex for at least all but one of the number of independent cycles. This process may be repeated until the model is manifold.

46 Claims, 11 Drawing Sheets

U.S. PATENT DOCUMENTS

| | | | |
|---|---|---|---|
| 7,372,460 B2 * | 5/2008 | Usami et al. | 345/419 |
| 7,522,163 B2 * | 4/2009 | Holmes | 345/419 |
| 2004/0059237 A1 | 3/2004 | Narayan et al. | |
| 2004/0254437 A1 | 12/2004 | Hauck et al. | |
| 2005/0096515 A1 | 5/2005 | Geng | |
| 2005/0203394 A1 | 9/2005 | Hauck | |
| 2005/0288813 A1 | 12/2005 | Yang et al. | |
| 2006/0015096 A1 | 1/2006 | Hauck et al. | |
| 2006/0095022 A1 | 5/2006 | Moll et al. | |
| 2006/0100502 A1 | 5/2006 | Chen et al. | |
| 2006/0100610 A1 | 5/2006 | Wallace et al. | |
| 2007/0057945 A1 | 3/2007 | Olson | |
| 2007/0058455 A1 * | 3/2007 | Usami et al. | 365/189.07 |
| 2007/0060833 A1 | 3/2007 | Hauck | |
| 2007/0073179 A1 | 3/2007 | Afonso et al. | |
| 2007/0208260 A1 | 9/2007 | Afonso | |
| 2007/0270705 A1 | 11/2007 | Starks | |
| 2008/0009758 A1 | 1/2008 | Voth | |

OTHER PUBLICATIONS

James Davis et al. "Filling Holes in Complex Surfaces using Volumetric Diffusion", IEEE, 2002.*

Patel et al. "Stitching and Filling Creating Conformal Faceted Geometry". Published Jan. 2006.*

Branch et al. "Automatic Hole-Filling of Triangular Meshes Using Local Radial Basis Function", IEEE, 2006.*

Wagner et al. "Repairing Non-manifold triangle meshes using simulated Annealing". Published 2004.*

Barber, C.B., et. al., The Quickhull Algorithm for Convex Hulls, pp. 1-15 (reprint of same titled article as published in ACM Transactions on Mathematical Software, Dec. 1996, pp. 469-483, vol. 22, No. 4).

Pachon, Jose, C., et. al., "Cardioneuroablation"—new treatment for neurocardiogenic syncope, functional AV block and sinus dysfunction using catheter RF-ablation, Europace, (2005) 7, 1-13, The European Society of Cardiology.

Pachon, Jose, C., et. al., A new treatment for atrial fibrillation based on spectral analysis to guide the catheter RF-ablation, Europace, (2004) 6, 590-601, The European Society of Cardiology.

Nademanee, Koonlawee, M.D., FACC, et. al., A new approach for catheter ablation of atrial fibrillation: Mapping of the electrophysiologic substrate, Journal of the American College of Cardiology, (2004) vol. 43, No. 11, 2044-53.

International Search Report for PCT/US07/89201 filed Dec. 31, 2007, and Written Opinion of International Searching Authority dated Jun. 20, 2008.

* cited by examiner

METHOD AND SYSTEM FOR REPAIRING TRIANGULATED SURFACE MESHES

CROSS-REFERENCE TO RELATED APPLICATIONS

This application is related to U.S. application Ser. No. 11/647,246 and U.S. application Ser. No. 11/647,275, both filed 29 Dec. 2006. The foregoing are hereby incorporated by reference as though fully set forth herein.

BACKGROUND OF THE INVENTION a. Field of the Invention

The instant invention relates to surface modeling. In particular, the instant invention relates to a system and method for repairing a triangulated mesh model of a three dimensional surface.

b. Background Art

It is well known to generate a heart chamber geometry in preparation for cardiac diagnostic or therapeutic procedures. Often, a mapping catheter is introduced into the heart chamber of interest and moved around within the heart chamber, either randomly, pseudo-randomly, or according to one or more preset patterns. The three-dimensional coordinates of the mapping catheter are measured using a localization system (sometimes also referred to as a "mapping system," "navigation system," or "positional feedback system"). The three-dimensional coordinates become a geometry point (or "location data point"). Multiple measurements may be taken as the catheter is moved within the heart chamber, resulting in a cloud of geometry points that defines the geometry of the heart chamber.

Various surface construction algorithms may be utilized to wrap a surface around the cloud of geometry points to obtain a surface representation of the heart chamber geometry. One such surface construction algorithm generates a convex hull about the cloud of geometry points. The convex hull may be generated using standard algorithms such as the Qhull algorithm. The Qhull algorithm is described in Barber, C. G., Dobkin, D. P., and Huhdanpaa, H. T., "The Quickhull algorithm for convex hulls," *ACM Trans. on Mathematical Software,* 22(4):469-483 (December 1996). Other algorithms used to compute a convex hull shape are also known.

Another surface construction algorithm is Alpha Shapes. The alpha shape is a generalization of the convex hull and a subgraph of the Delaunay triangulation. For a sufficiently large alpha, the alpha shape is identical to the convex hull, while for a sufficiently small alpha, the alpha shape is just the set of geometry points themselves. Intermediate values of alpha produce surfaces that reconstruct the model of the heart chamber to various levels of detail.

Still another exemplary method for creating a shell corresponding to the shape of the heart chamber fits a radial array of bins around groups of geometry points. The bins are typically constructed by determining a mean center point of the cloud of geometry points and extending borders radially outward from the mean center point to the furthest geometry point within the slice encompassed by the bin. The radial end faces of the bins thus approximate the surface of the heart chamber wall. Common graphic shading algorithms can then be employed to "smooth" the surface of the shell thus created out of the radial end faces of the bins.

Typically, these surface construction algorithms result in a surface modeled by a mesh of triangular facets—that is, a list of (x, y, z) coordinates for each vertex and another list of (i, j, k) indices into the first list describing which vertices are connected to form each triangle of the mesh. If the surface is closed, it is desirable for the mesh to be "watertight," meaning that every edge of every triangular facet is shared by exactly one other triangular facet. It is also desirable that the mesh be "manifold," which imposes the additional requirement that any two edges sharing a vertex can be reached from each other by stepping across a unique sequence of triangles sharing edges with each other and that vertex—in other words, that no two distinct parts of the mesh "touch" each other at a single vertex.

In actual practice, however, triangulated surface meshes are not always both watertight and manifold. For instance, joining or merging two triangulated surface meshes into a single triangulated surface mesh may leave gaps, duplicate vertices, duplicate facets, holes, or other problems near the region or regions where they intersect. Unfortunately, these problems may interfere with subsequent processing algorithms that assume or require meshes to be both watertight and manifold.

BRIEF SUMMARY OF THE INVENTION

It is desirable to be able to repair a triangulated surface mesh model to be substantially watertight.

It is also desirable to be able to repair a triangulated surface mesh model to be substantially manifold.

It is also desirable to orient the facets of a triangulated surface mesh model to facilitate computation of normal vectors.

Disclosed herein is a method of repairing a surface mesh model including a plurality of facets. The method includes the following steps: obtaining a surface mesh model for a three dimensional object including a plurality of triangular facets, each of the facets being defined by three edges that connect three vertices; identifying a hole in the surface mesh model, the hole being defined by a plurality of hole edges; determining a plurality of hole vertices that define the plurality of hole edges that define the hole; and filling the hole using a plurality of triangular facets. Filling the hole using a plurality of triangular facets includes the steps of: selecting a pair of the hole vertices, wherein the selected pair of the hole vertices is not connected by a hole edge; defining a fabricated edge connecting the selected pair of the hole vertices; checking to see if one or more triangles are formed using the newly defined fabricated edge, and if so, defining the newly formed one or more triangles as one or more new triangular facets, and adding the one or more new triangular facets to the plurality of triangular facets of the surface mesh model; and, optionally, if one or more triangles are not formed, continuing to define fabricated edges until one or more triangles are formed, and defining the newly formed one or more triangles as one or more new triangular facets, and adding the one or more new triangular facets to the plurality of triangular facets of the surface mesh model. In some embodiments, the step of selecting a pair of the hole vertices includes selecting a closest pair of the hole vertices. Alternatively, the step of selecting a pair of the hole vertices may include: locating a smallest interior angle of the plurality of hole edges that define the hole; and selecting a pair of the hole vertices that define a pair of the plurality of hole edges that intersect at the smallest interior angle of the plurality of hole edges that define the hole. The steps of identifying a hole in the surface mesh model, determining a plurality of hole vertices that define the plurality hole edges that define the hole, and filling the hole using a plurality of triangular facets may be repeated until the surface mesh model is watertight.

In another aspect of the present invention, a method of repairing a surface mesh model including a plurality of triangular facets includes the steps of: obtaining a three dimensional surface mesh model including a plurality of triangular facets, each of the triangular facets being defined by three edges that connect three vertices; identifying a plurality of hole edges in the surface mesh model; selecting one of the plurality of hole edges; creating a cycle of hole edges that define a hole in the surface mesh model, wherein the cycle of hole edges includes the selected one of the plurality of hole edges; converting the cycle of hole edges into two or more cycles of exactly three edges, thereby defining a plurality of hole-filling triangles; and adding a triangular facet to the surface mesh model for each of the plurality of hole-filling triangles. Optionally, the step of selecting one of the plurality of hole edges includes: creating a prioritized queue of hole edges using triangle counts for each hole edge in the queue, assigning a higher priority to any hole edge having a triangle count less than two, and assigning a lower priority to any hole edge having a triangle count greater than two; and selecting one of the plurality of hole edges from the prioritized queue of hole edges in accordance with the assigned priority. Preferably, the cycle of hole edges created is the shortest possible cycle of hole edges including the selected hole edge.

Typically, the cycle of hole edges will be converted into two or more cycles of edges by defining one or more fabricated edges connecting non-neighboring vertices of the cycle of hole edges. Fabricated edges may be defined by identifying a closest pair of non-neighboring vertices of the cycle of hole edges and defining the fabricated edge connecting the closest pair of non-neighboring vertices, thereby splitting the cycle of hole edges into two cycles of edges. Alternatively, fabricated edges may be defined by identifying a smallest interior angle of the cycle of hole edges and defining the fabricated edge that completes a triangle with the pair of hole edges that intersect at the smallest interior angle, thereby splitting the cycle of hole edges into two cycles, at least one of which has exactly three edges. Additional fabricated edges may be defined to further split at least one of the two cycles into which the cycle of hole edges was split, preferably until the original cycle of hole edges is converted into two or more cycles of exactly three edges each.

Optionally, the method may also include orienting the plurality of triangular facets, as by listing the vertices of each triangular facet in an order such that any two triangular facets having a shared edge list the vertices defining the shared edge in opposite orders. For example, the facets may be oriented by listing the vertices of each triangular facet in a counterclockwise order when viewed from outside the three dimensional mesh surface.

The method may also include identifying and removing one or more non-manifold triangular facets from the plurality of triangular facets. Non-manifold triangular facets may be identified by having two edges with a triangle count greater than two, one edge with a triangle count greater than two and two edges with a triangle count of one, or any one edge with a triangle count greater than two.

It is also contemplated that the method may include the step of filtering the surface mesh model to eliminate one or more duplicate vertices. Typically, a duplicate vertex is a vertex that is closer than a preset distance, which may be defined as a multiple of machine epsilon, to an existing vertex. When the duplicate vertices are deleted from the surface mesh model, triangular facets defined by one or more duplicate vertices may be redefined to be defined by one or more existing vertices. This may introduce degenerate facets, which are preferably removed from the plurality of triangular facets.

Also disclosed herein is a method of repairing a surface mesh model including a plurality of triangular facets to be substantially both watertight and manifold. The method includes the steps of: a) identifying a plurality of hole edges in the surface mesh model; b) arranging the plurality of hole edges in an edge queue from a highest priority hole edge to a lowest priority hole edge, wherein a hole edge having a triangle count less than two has a higher priority than a hole edge having a triangle count greater than two; c) selecting the highest priority hole edge within the edge queue; d) determining a cycle of hole edges including the selected hole edge; e) converting the cycle of hole edges to one or more fabricated triangular facets; f) adding the one or more fabricated triangular facets to the surface mesh model; and, optionally, g) updating the edge queue. Steps c), d), e), f), and g) may be repeated until the edge queue is empty.

The step of converting the cycle of hole edges to one or more fabricated triangular facets typically includes: defining a fabricated triangular facet corresponding to the cycle of hole edges when the cycle of hole edges contains exactly three hole edges; and splitting the cycle of hole edges into two or more cycles of exactly three edges and defining two or more corresponding triangular facets when the cycle of hole edges contains four or more hole edges. Expressed algebraically, for a cycle of s hole edges, n fabricated edges connecting non-neighboring vertices, where n=s−3, will split the cycle of hole edges into n+1 cycles of three edges each.

The method may also include repairing regions of the surface mesh model that "pinch" at a single vertex. This may include: selecting a vertex of one of the plurality of triangular facets; determining a number of independent cycles of triangular facets sharing the selected vertex; and if the number of independent cycles of triangular facets sharing the selected vertex is two or more, redefining the selected vertex for at least one of the two or more independent cycles of triangular facets sharing the selected vertex. The vertex may be redefined by selecting one of the two or more independent cycles of triangular facets sharing the selected vertex, defining a new vertex a short distance from the selected vertex in a direction normal to and towards the selected independent cycle of triangular facets, and redefining the selected independent cycle of triangular facets to share the new vertex rather than the selected vertex. To repair the "pinch," this process may be repeated for at least all but one of the two or more independent cycles of triangular facets sharing the selected vertex.

In yet another aspect of the invention, a method of repairing a surface mesh model including a plurality of triangular facets includes the following steps: creating a cycle of hole edges having s edges, wherein s is greater than or equal to three, the cycle of hole edges defining a hole in the surface mesh model; defining n fabricated edges connecting non-neighboring vertices of the cycle of hole edges, wherein n=s−3, such that the hole in the surface mesh model is defined by (n+1) cycles of exactly three edges each; and adding a triangular facet to the surface mesh model for each of the (n+1) cycles of exactly three edges defining the hole in the surface mesh model. These steps are preferably iteratively repeated until the surface mesh model is watertight.

Also disclosed is a method of repairing a surface mesh model including a plurality of triangular facets, including the steps of: obtaining a three dimensional surface mesh model comprising a plurality of triangular facets, each of the triangular facets being defined by three edges that connect three vertices; selecting a vertex of one of the plurality of triangular facets; identifying a subset of the plurality of triangular facets including the selected vertex; creating a cycle of triangular facets from the subset of the plurality of triangular facets; and redefining the selected vertex for all triangular facets in the cycle of triangular facets if every triangular facet within the subset of the plurality of triangular facets is not included in the cycle of triangular facets. The step of redefining the selected vertex for all triangular facets in the cycle of triangular facets may include: defining a new vertex a short distance from the selected vertex; and redefining all triangular facets in the cycle of triangular facets to include the new vertex instead of the selected vertex. Typically, the new vertex will be defined a short distance from the selected vertex in a direction normal to and towards the cycle of triangular facets. The steps may be repeated until the surface mesh model is manifold at the selected vertex.

Also disclosed herein is a system for repairing a surface mesh model for a three dimensional object, the surface mesh model including a plurality of triangular facets, the system including: a hole identification processor configured to identify a cycle of hole edges that defines a hole in the surface mesh model, the cycle of hole edges being defined by three or more vertices; and a facet fabrication processor configured to fabricate one or more triangular facets that fill the hole in the surface mesh model by interconnecting the three or more vertices of the cycle of hole edges. Preferably, the hole identification processor is configured to identify a shortest possible cycle of hole edges that defines a hole in the surface mesh model. Typically, the facet fabrication processor defines fabricated triangular facets corresponding to cycles of exactly three hole edges defined by exactly three vertices, and splits the cycle of hole edges into two or more cycles of exactly three edges and defines a corresponding number of fabricated triangular facets when the cycle of hole edges contains four or more hole edges defined by four or more vertices. The system optionally includes a facet checking processor configured to identify and discard one or more non-manifold triangular facets of the plurality of triangular facets.

In another embodiment of the invention, a system for repairing a surface mesh model for a three dimensional object, the surface mesh model including a plurality of triangular facets, each of the plurality of triangular facets being defined by three edges interconnecting three vertices, the system includes: a vertex checking processor configured to determine a number of independent cycles of triangular facets sharing a selected vertex; and a vertex redefinition processor configured to redefine the selected vertex for at least all but one of the number of independent cycles of triangular facets sharing the selected vertex when the number of independent cycles of triangular facets sharing the selected vertex is two or more. The vertex redefinition processor may redefine the selected vertex by: selecting one of the number of independent cycles of triangular facets sharing the selected vertex; defining a new vertex a short distance from the selected vertex in a direction normal to and towards the selected independent cycle of triangular facets; and redefining the selected independent cycle of triangular facets to share the new vertex rather than the selected vertex.

An advantage of the present invention is that it fills holes within a triangulated surface mesh model.

Another advantage of the present invention is that it identifies and discards non-manifold triangular facets.

Still another advantage of the present invention is that it repairs non-manifold vertices of a triangulated surface mesh model.

A further advantage of the present invention is that it ensures that the vertices of the facets in the triangulated surface mesh model are listed in a consistent fashion, thereby facilitating the computation of normal vectors.

Yet another advantage of the present invention is that it filters out duplicate vertices and degenerate triangular facets.

The foregoing and other aspects, features, details, utilities, and advantages of the present invention will be apparent from reading the following description and claims, and from reviewing the accompanying drawings.

DETAILED DESCRIPTION OF THE INVENTION

The present invention provides a method and system for repairing surface mesh models, for example surface mesh models of three-dimensional objects. Such surface mesh models are often used in procedures carried out within a human body, and in particular in cardiac diagnostic and therapeutic procedures such as the treatment of atrial fibrillation by ablation of tissue. It is contemplated, however, that the present invention may be practiced to good advantage in other contexts where it is desirable to ensure that a surface mesh model is both watertight and manifold. Further, one of ordinary skill in the art will appreciate that the principles described herein may be applied in any number of dimensions.

Figure 1:
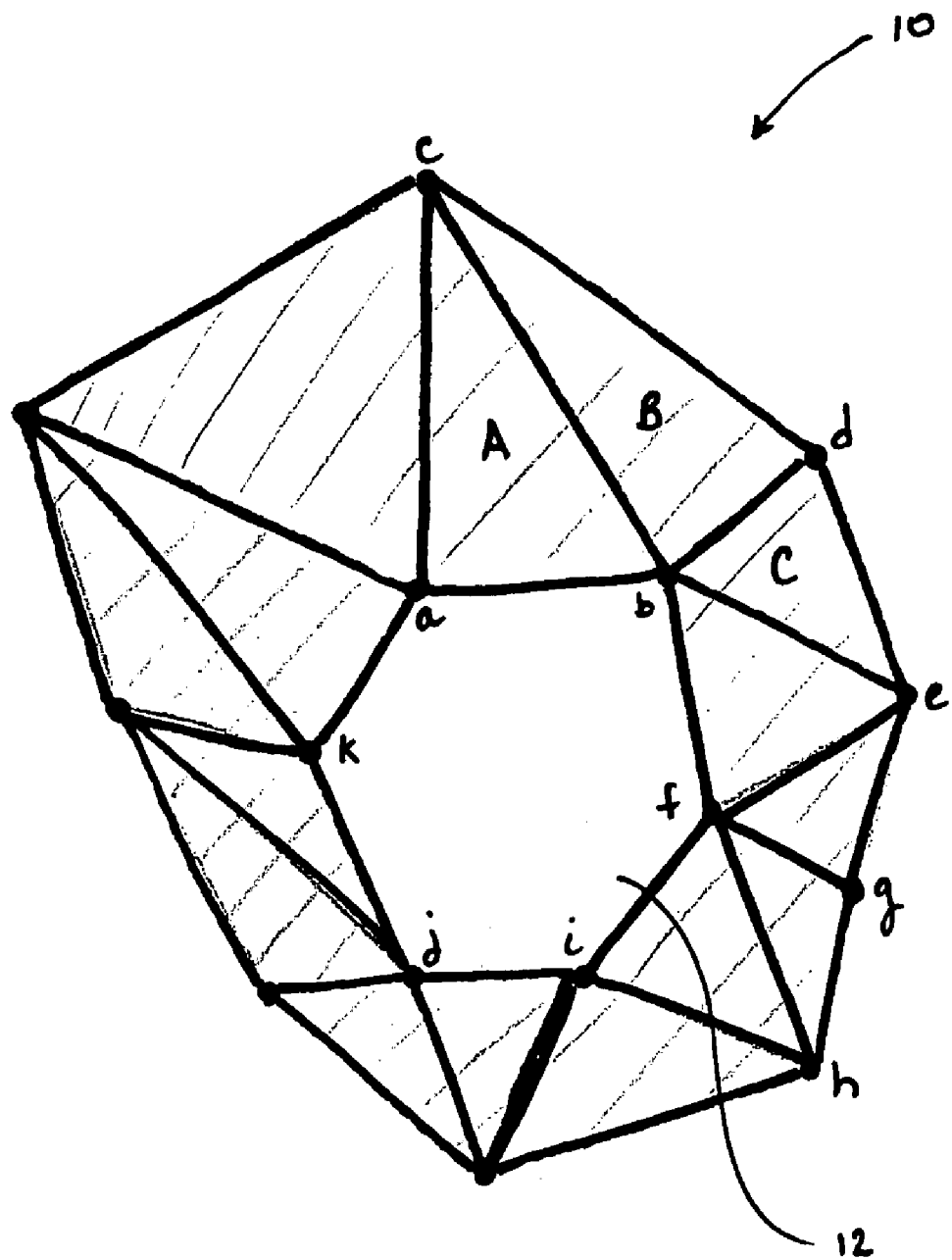
FIG. 1 is a two-dimensional representation of a triangulated surface mesh model including a hole.

FIG. 1 illustrates a surface mesh model 10 including a plurality of triangular facets. For ease of presentation and understanding, surface mesh model 10 is presented in two dimensions, and the triangular facets are cross-hatched and labeled with capital letters. Each of the triangular facets is defined by three edges that connect three vertices. The vertices are labeled with lower case letters, and edges are referred to herein by the vertices that they connect.

As should be familiar to one of ordinary skill in the art, surface mesh model 10 may be expressed as a collection of coordinates that describe the location of the vertices in three dimensional space and a collection of indices into the collection of coordinates that describe which of the vertices are interconnected to form each triangular facet of the surface mesh model. For example, the location of each vertex may be expressed as a three dimensional Cartesian coordinate, such that the location of vertex a may be expressed as $(x_a, y_a, z_a)$, the location of vertex b as $(x_b, y_b, z_b)$, the location of vertex c as ($x_c$, $y_c$, $z_c$), the location of vertex d as ($x_d$, $y_d$, $z_d$), and so on. Likewise, each triangular facet may be expressed as a set of three vertices, the three possible combinations of which define the three edges of the triangular facet, such that triangular facet A may be expressed as (a, b, c) (e.g., edges ab, ac, and bc), triangular facet B as (b, d, c) (e.g., edges bd, bc, and dc), triangular facet C as (b, e, d) (e.g., edges be, bd, and ed), and so forth.

Preferably, the vertices of each triangular facet are listed in each set in counter-clockwise order as viewed from outside the surface mesh model, which facilitates consistent computation of normal vectors. This is referred to herein as "orienting" the triangular facets. The facets may be oriented by listing the vertices of each triangular facet in an order such that any two triangular facets having a shared edge list the vertices defining that edge in opposite order. For example, in FIG. 1, triangular facet A shares edge bc with triangular facet B. Triangular facet A lists the vertices as (a, b, c), while triangular facet B lists the vertices as (c, b, d). Thus, the edge is listed as bc for triangular facet A, but cb for triangular facet B. Likewise, edge bd is part of triangular facet B, while edge db is part of triangular facet C. If it is necessary to reverse the order in which vertices are listed for a particular facet, that facet may be flagged so the ordering is not changed again later.

The term "triangle count" is used herein to describe the number of triangular facets sharing a given edge. For example, in FIG. 1, edge bc has a triangle count of two, since it is shared by triangular facet A and triangular facet B. Edge ab, on the other hand, has a triangle count of one, since it appears only in triangular facet A. An edge having a triangle count not equal to two is referred to herein as a "hole edge," while the vertices defining a hole edge are referred to herein as "hole vertices."

For closed surfaces, it is desirable for the surface mesh model to be watertight, a condition that is satisfied if each edge has a triangle count of exactly two. As illustrated in FIG. 1 and described above, however, the surface mesh model may include one or more hole edges as identified by triangle counts. Thus, a hole in the surface mesh model may be identified by selecting one of the hole edges and creating a closed loop, or "cycle," of hole edges including the selected hole edge; the cycle of hole edges defines the hole in the surface mesh model. For example, in FIG. 1, a hole 12 in surface mesh model 10 is defined by the cycle of hole edges ab, bf, fi, ij, jk, and ka. It should be understood that neighboring hole vertices are connected by hole edges (in a fashion similar to a connect-the-dots puzzle), while non-neighboring hole vertices are not connected by hole edges. It is particularly desirable to create the shortest possible cycle of hole edges including the selected hole edge.

A hole in the surface mesh model may be filled by adding one or more triangular facets to the surface mesh model. The present invention fabricates these new triangular facets by selecting a pair of non-neighboring hole vertices (e.g., a pair of hole vertices not connected by a hole edge) and defining a fabricated edge connecting the selected pair of hole vertices. If the newly defined fabricated edge creates one or more triangles, then the one or more triangles are defined as a corresponding number of new triangular facets, which are then added to the surface mesh model. If, on the other hand, the newly defined fabricated edge does not create one or more triangles, then additional fabricated edges may be defined until one or more triangles are created, which may then be added to the surface mesh model as fabricated triangular facets.

Figure 2:
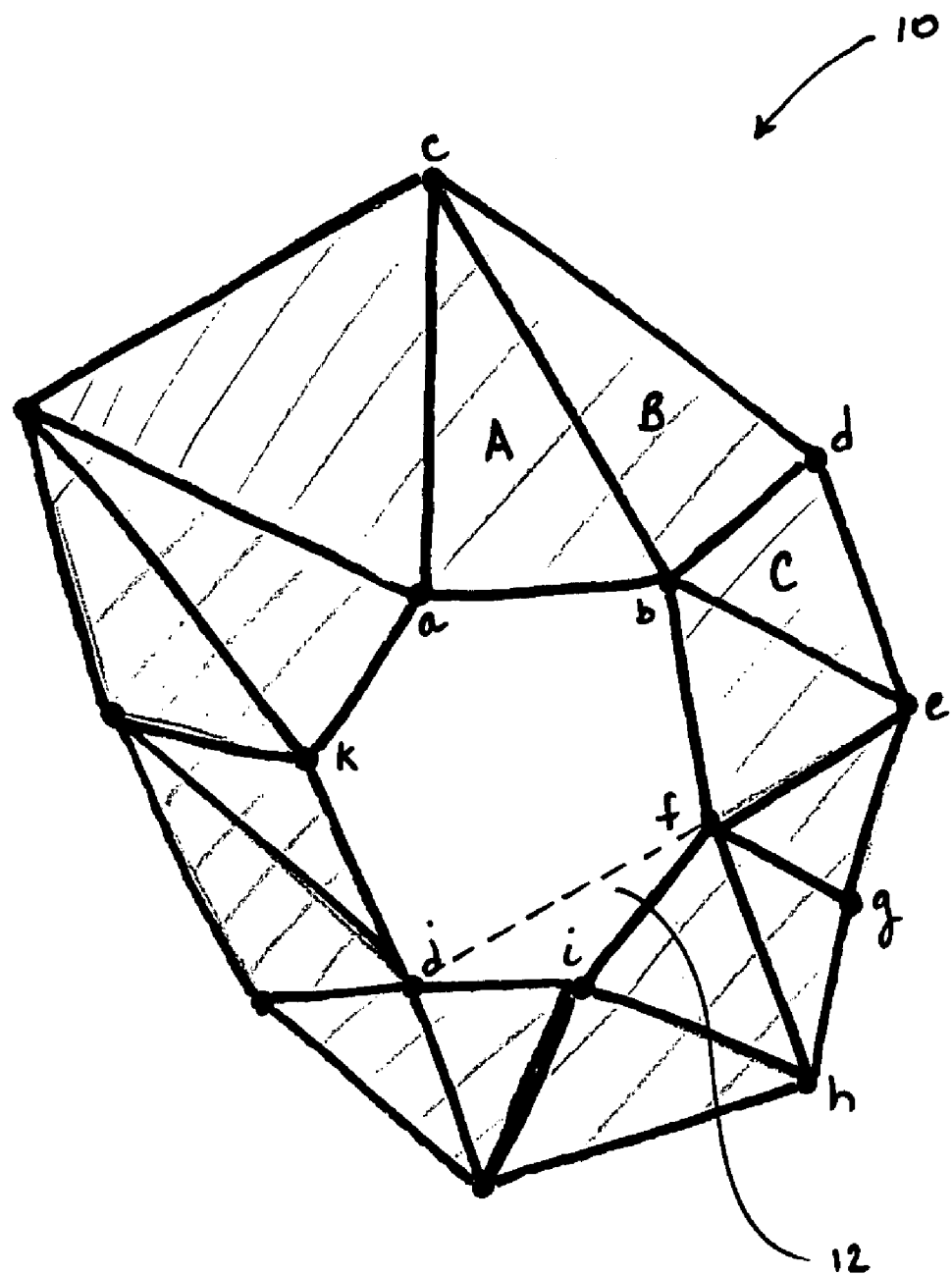
FIG. 2 illustrates fabrication of an edge connecting a closest non-neighboring pair of hole vertices.
Figure 3:
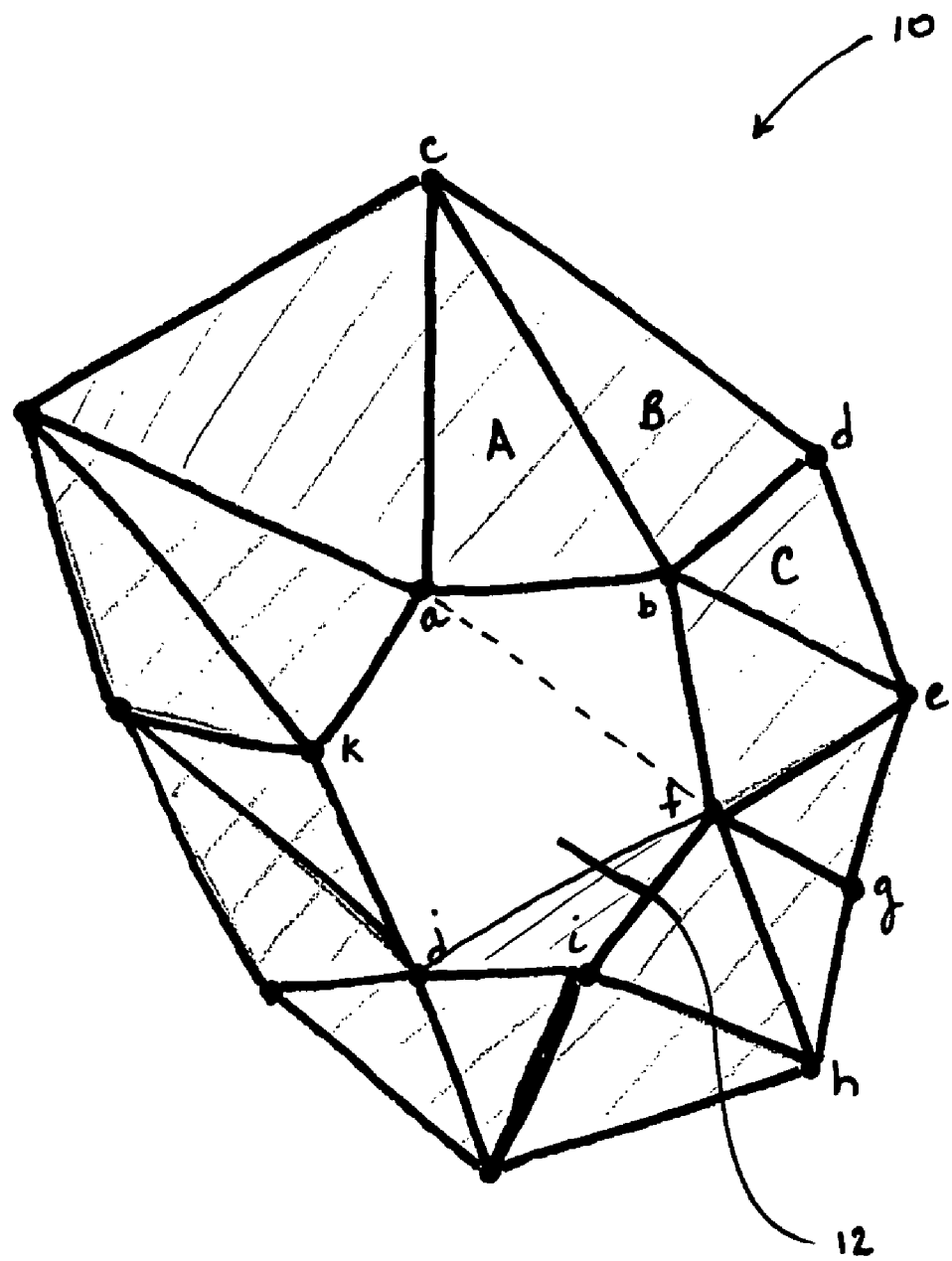
FIG. 3 illustrates addition of a new hole-filling triangular facet to FIG. 2 and fabrication of an additional edge connecting non-neighboring hole vertices.

In one preferred method of creating new triangular facets to fill a hole in the surface mesh model, the fabricated edge is defined between the closest pair of non-neighboring hole vertices. It should be understood that such a fabricated edge may or may not create one or more triangles depending upon the relationship between the closest pair of non-neighboring hole vertices. For example, in FIG. 1, assume that hole vertices j and f are closer to each other than any other pair of non-neighboring hole vertices defining hole 12. Thus, fabricated edge jf is defined connecting hole vertices j and f as shown in broken line in FIG. 2. Since fabricated edge jf creates a hole-filling triangle (j, i, f), this new triangle may be defined as a new triangular facet and added to the surface mesh model (FIG. 3).

Figure 4:
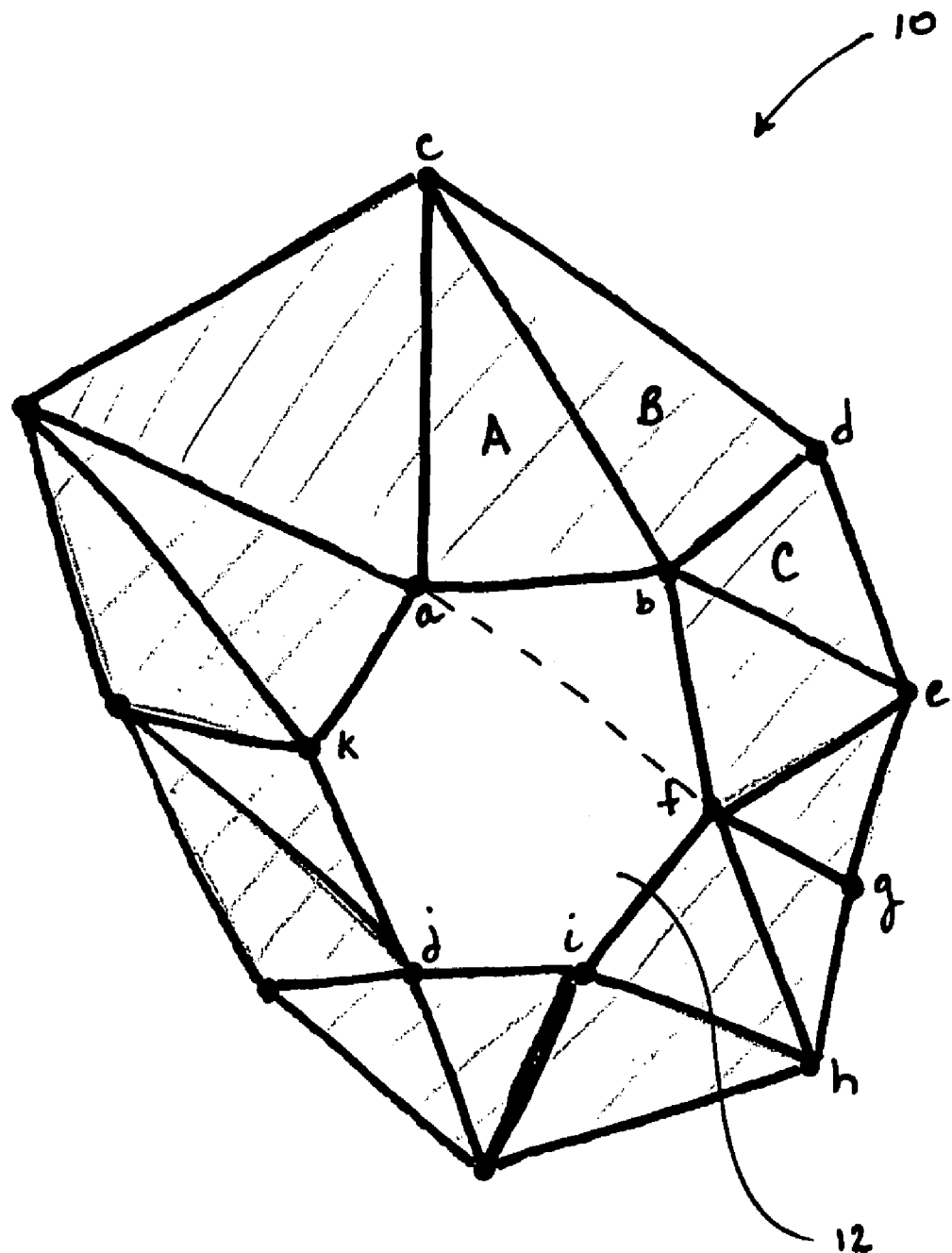
FIG. 4 illustrates fabrication of an edge completing a triangle with hole edges intersecting at a smallest interior angle.
Figure 5:
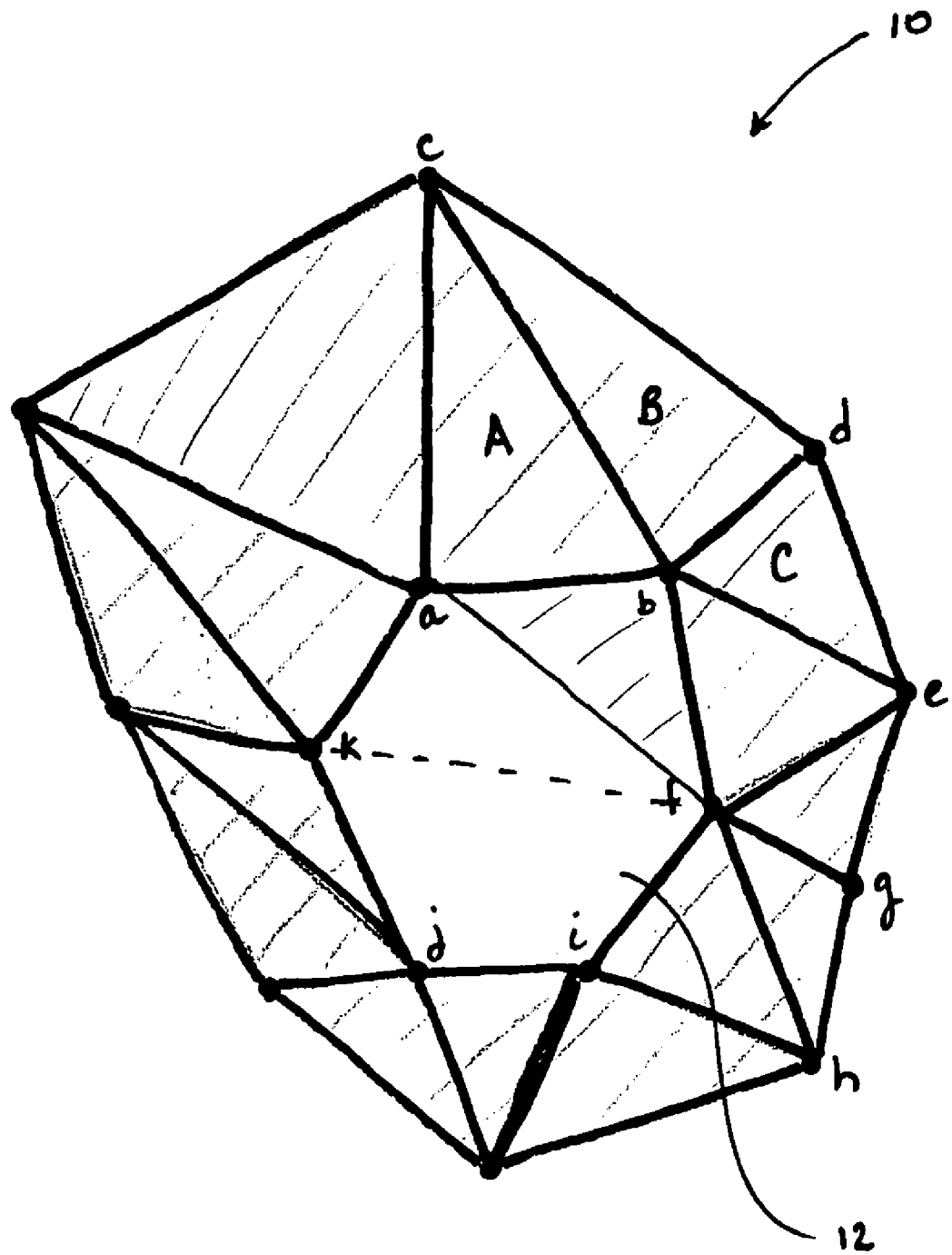
FIG. 5 illustrates addition of a new hole-filling triangular facet to FIG. 4 and fabrication of an additional edge connecting non-neighboring hole vertices.

An alternative method of determining which pair of non-neighboring hole vertices to connect involves locating the smallest interior angle of the cycle of hole edges. A fabricated edge may then be defined that completes a hole-filling triangle with the hole edges that intersect at the smallest interior angle of the cycle of hole edges. For example, in FIG. 1, assume that the smallest interior angle is between hole edges ab and bf. Therefore, fabricated edge af, shown in broken line in FIG. 4, is defined connecting hole vertices a and f thereby creating new triangle (a, f, b), which may be added to the surface mesh model as a new triangular facet (FIG. 5).

As should be clear from the foregoing discussion, a fabricated edge becomes a hole edge when it is added to the surface mesh model, either by creating a new facet or by splitting a single cycle of hole edges into two cycles of hole edges. For example, fabricated edge jf in FIG. 2 splits the original cycle of hole edges (ab, bf, fi, ij, jk, ka) into two cycles of hole edges (ab, bf, fj, jk, ka) and (fi, ij, jf), the latter of which may be added to the surface mesh model as a triangular facet. Similarly, fabricated edge af in FIG. 4 splits the original cycle of hole edges into two cycles of hole edges (af, fi, ij, jk, ka) and (ab, bf, fa), the latter of which may be added to the surface mesh model as a triangular facet.

Advantageously, the preferred methods of defining fabricated edges typically result in new triangular facets having a largest angle that is as small as possible, as opposed to sliver-like triangular facets having one very large angle or two angles close to 90 degrees. It is contemplated, however, that other methods of defining fabricated edges may be practiced without departing from the spirit and scope of the present invention.

To complete the filling of hole 12, additional fabricated edges may be defined between non-neighboring hole vertices of these resulting cycles of hole edges. For example, referring again to FIG. 3, assume that hole vertices a and f are closer to each other than any other pair of non-neighboring hole vertices in cycle of hole edges (ab, bf, fj, jk, ka). A fabricated edge af, shown in broken line, may be defined connecting hole vertices a and f, thereby creating a hole-filling triangle (a, f b) that may be added to the surface mesh model as a triangular facet (not shown). The addition of triangular facet (a, f, b) also leaves a remaining cycle of four hole edges (ak, kj, jf, fa).

Figure 6:
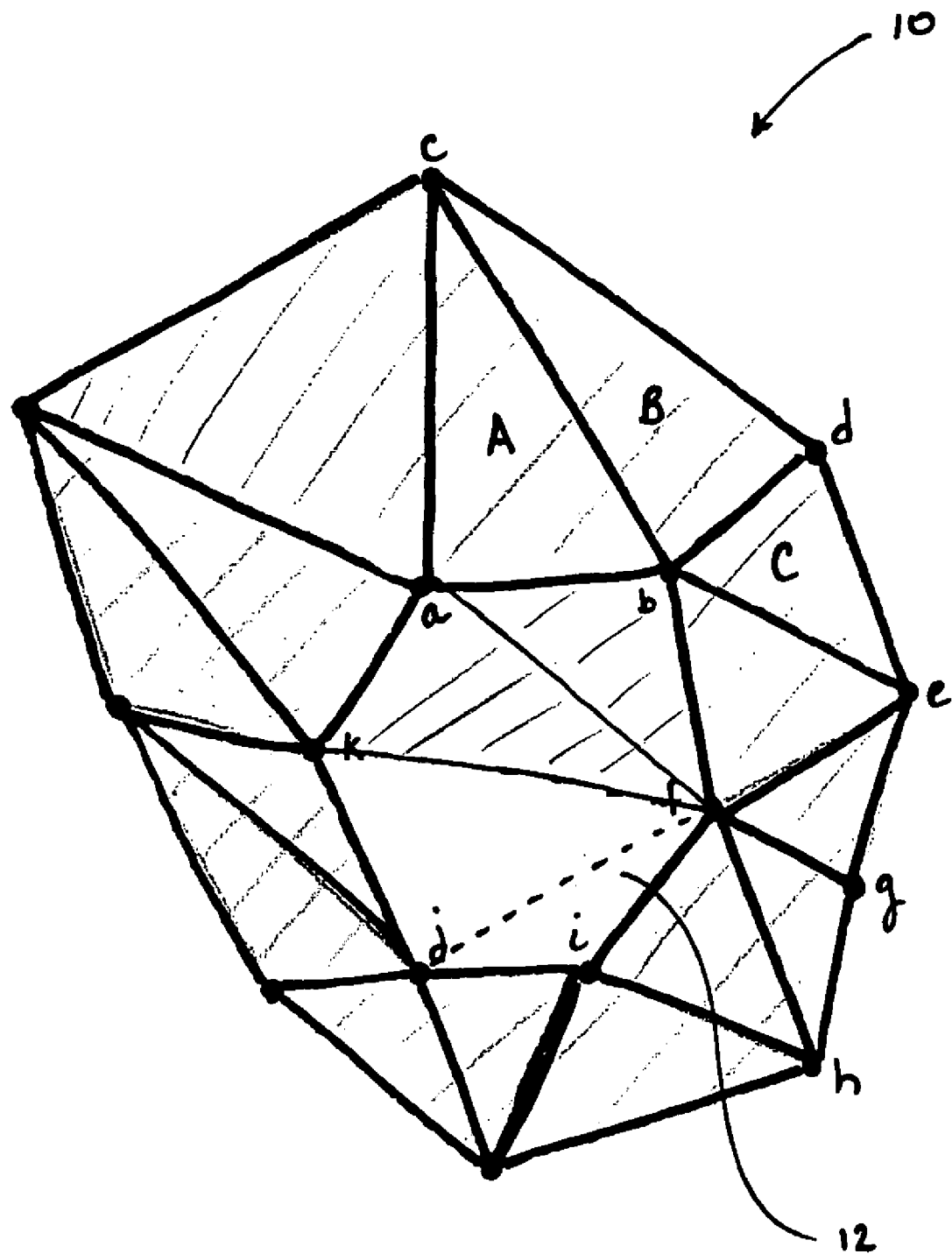
FIG. 6 illustrates the surface mesh model of FIG. 5 after an additional iteration of facet addition and edge fabrication.

Similarly, referring again to FIG. 5, assume that the smallest interior angle in cycle of hole edges (ak, kj, ji, if, fa) is between hole edges ak and fa. A fabricated edge kf, shown in broken line, may be defined connecting hole vertices k and f, thereby creating a hole-filling triangle (k, f, a) that may be added to the surface mesh model as a triangular facet (FIG. 6). As should be clear from FIG. 6, this leaves a remaining cycle of four hole edges (kj, ji, if, fk).

Figure 7:
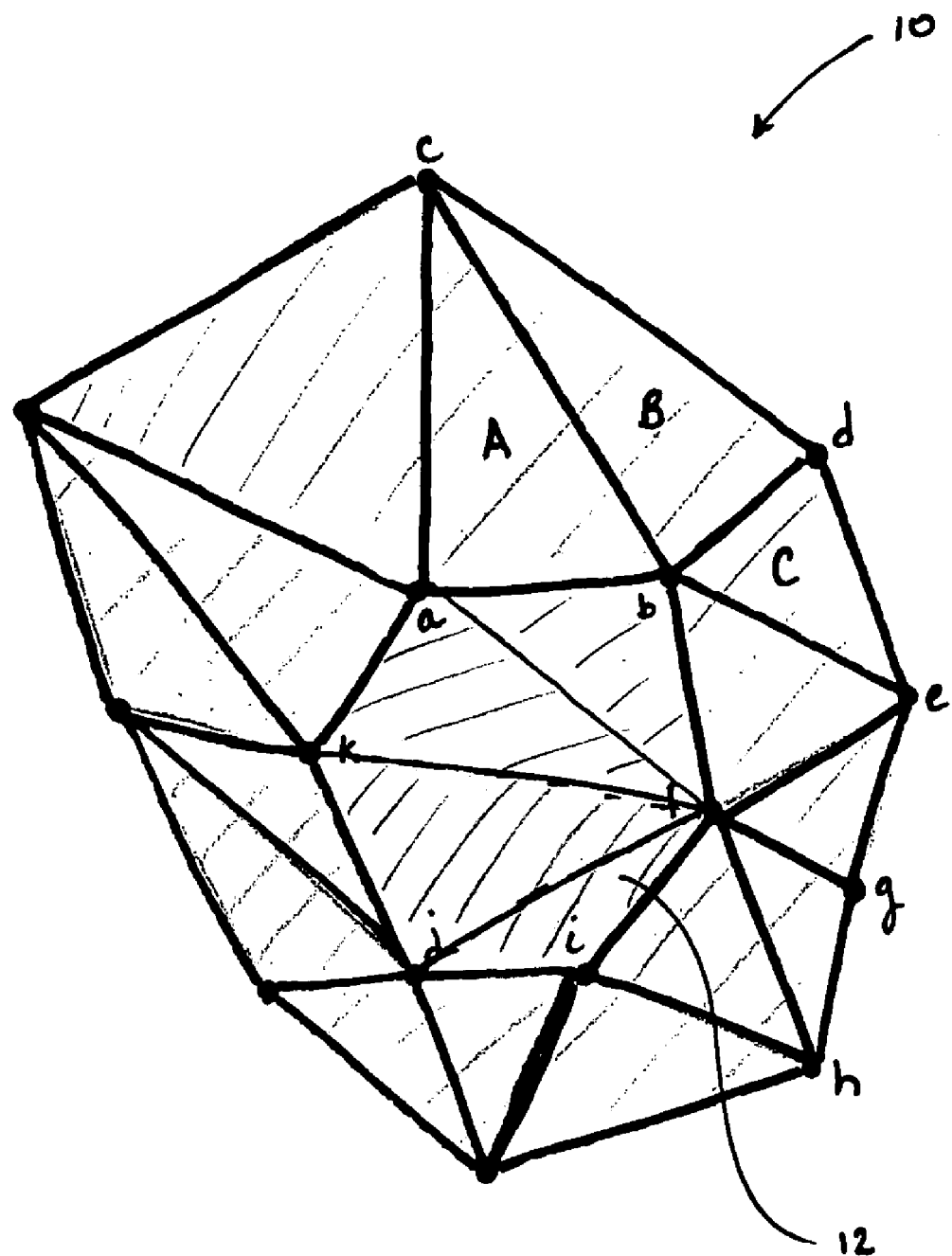
FIG. 7 illustrates the surface mesh model of FIG. 1 after the hole has been completely filled with newly defined triangular facets.

Of course, further iterations of either preferred method may be performed until the original cycle of hole edges (ab, bf, fi, jk, ka) has been converted into two or more cycles of exactly three edges each, thereby defining a plurality of hole-filling triangles that may be added to the surface mesh model as triangular facets to repair hole 12. Thus, in FIG. 6, assuming that the smallest interior angle of cycle of hole edges (kj, ji, if, fk) is at the intersection of hole edges fk and kj, a fabricated edge fj, shown in broken line, may be defined connecting hole vertices f and j, thereby creating two hole-filling triangles (j, f, k) and (j, i, f). Hole-filling triangles (j, f, k) and (j, i, f) may be added to the surface mesh model as new triangular facets, thereby completing the repair of hole 12 (FIG. 7).

In general, for a cycle of s hole edges, the number of fabricated edges n required to split the cycle of hole edges into one or more cycles of exactly three edges each is typically given by the equation $n = s - 3$. Further, the fabrication of n edges will split the original cycle of s hole edges into n+1 cycles of exactly three edges each. Thus, for the cycle of six hole edges illustrated in FIGS. 1-7, three fabricated edges were required to split the original cycle of hole edges into four cycles of exactly three edges.

The process of identifying and filling holes (e.g., identifying cycles of hole edges and interconnecting non-neighboring hole vertices to create a plurality of hole-filling triangles) may be repeated until the surface mesh model is substantially watertight (e.g., until as many edges within the surface mesh model as possible have triangle counts of exactly two). Preferably, this is accomplished by creating a prioritized queue of hole edges once triangle counts have been used to identify a plurality of hole edges in the surface mesh model. Each hole edge is assigned a priority based on its triangle count: hole edges having triangle counts less than two receive a higher priority than hole edges having triangle counts greater than two. A hole edge is then selected from the top of the queue (e.g., the highest priority hole edge within the queue) and used in creating a cycle of hole edges.

As hole edges are converted to non-hole edges by the addition of new triangular facets, they are preferably removed from the queue. Hole edges may also be removed from the queue if the current hole cannot be filled correctly for any reason. The step of removing hole edges from the queue for either reason is referred to herein as "updating" the queue. The steps of selecting a hole edge from the top of the queue, using it to create a cycle of hole edges, converting the cycle of hole edges to one or more fabricated triangular facets, adding the fabricated triangular facets to the surface mesh model, and updating the queue may be iteratively repeated until the queue is empty, at which point the surface mesh model will preferably be watertight.

The hole-filling process described above is illustrated in the flowchart of FIG. 8. Surface mesh model 10 is input into a process 100 that identifies hole edges within the surface mesh model. In step 102, the hole edges are prioritized according to their triangle counts, and the highest priority hole edge is selected in step 104. In step 106, the shortest possible cycle of hole edges including the selected hole edge is created.

Decision block 108 checks to see if the shortest possible cycle of hole edges contains only three hole edges. If so, a process 110 adds a triangular facet corresponding to the cycle of hole edges to the surface mesh model, and the queue is updated in step 112. If the shortest possible cycle of hole edges contains four or more hole edges, a process 114 fabricates a new edge connecting non-neighboring vertices of the cycle of hole edges, thereby splitting the original cycle of hole edges into two cycles of edges.

Decision block 116 checks to see if each of these cycles contains exactly three edges. If so, process 110 adds corresponding triangular facets to the surface mesh model. If not, process 114 fabricates an additional new edge.

Decision block 118 determines whether the edge queue is empty, at which point the surface mesh model will be as watertight as possible. If so, the repaired surface mesh model 14 is output. If not, the process repeats from step 104.

Figure 9:
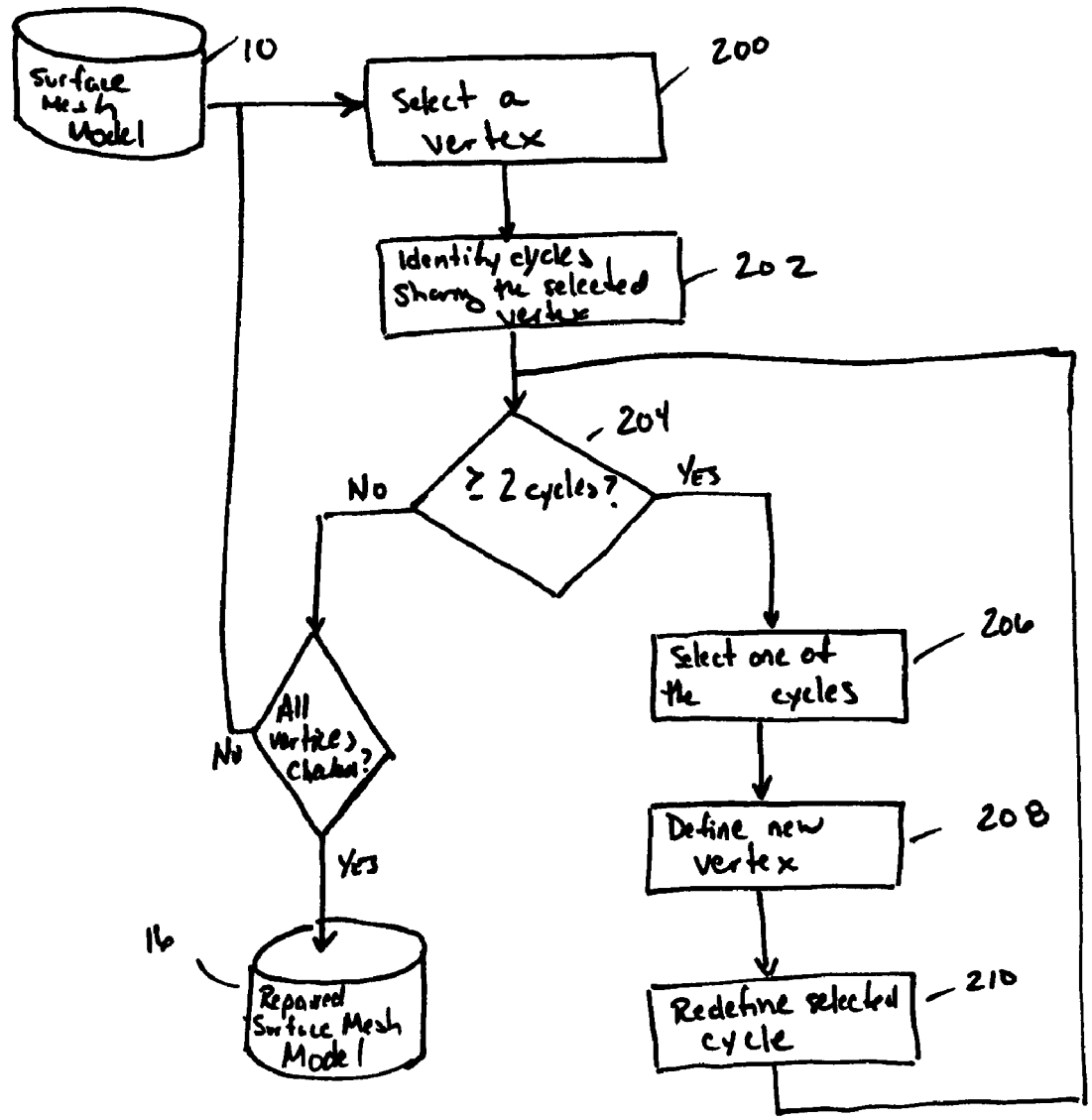
FIG. 9 is a flowchart illustrating a method of repairing non-manifold vertices in a surface mesh model.

In addition to filling holes within the surface mesh model in order to make the surface mesh model substantially watertight, the present invention repairs surface mesh models having two parts that "pinch" at a single vertex, and that are therefore non-manifold. As one of ordinary skill in the art will understand, a surface mesh model is "manifold" if any two edges sharing a given vertex can be reached from each other by stepping across a single cycle of triangular facets sharing edges with each other and the given vertex. If not every triangular facet sharing the given vertex is included in the cycle of triangular facets, the surface mesh model is non-manifold at the given vertex. This process is illustrated in the flowchart of FIG. 9, which begins with the input of surface mesh model 10 to a vertex selection process 200.

To determine whether the surface mesh model is manifold at the selected vertex, the number of independent cycles of triangular facets sharing the selected vertex is determined in step 202. If there is only one independent cycle of triangular facets, then the surface mesh model is manifold at the selected vertex. If, however, two or more independent cycles of triangular facets share the selected vertex (decision block 204), then the surface mesh model is non-manifold at the selected vertex. In other words, by identifying a subset of the plurality of triangular facets that share the selected vertex, identifying a cycle of triangular facets sharing the selected vertex, and checking whether every triangular facet within the subset is also within the cycle of triangular facets, it is possible to determine whether a selected vertex is manifold or non-manifold.

To repair the surface mesh model to be manifold at the selected vertex, the selected vertex is redefined for at least one of the two or more independent cycles of triangular facets sharing the selected vertex. This may be accomplished by choosing one of the independent cycles of triangular facets in step 206 and defining a new vertex a short distance from the selected vertex in a direction normal to and towards the chosen independent cycle of triangular facets in step 208. The short distance is preferably sufficiently large so as to separate the independent cycles of triangular facets (thereby making the surface mesh model more manifold at the selected vertex), while being sufficiently small so as to keep the surface mesh model watertight (e.g., the new vertex does not introduce a hole into the surface mesh model). The small distance may be expressed as a multiple of machine epsilon. "Machine epsilon" is the smallest number that can be represented in a computer without the use of exponents.

The chosen independent cycle of triangular facets may then be redefined to share the new vertex rather than the original selected vertex in step 210, thereby reducing the number of independent cycles of triangular facets sharing the selected vertex by one. By looping through decision block 204, the selected vertex may be redefined in this fashion for all but one of the independent cycles of triangular facets sharing the selected vertex, with each of the independent cycles of triangular facets sharing a unique duplicate vertex and allowing the last of the independent cycles to retain the originally selected vertex. Of course, the process may also be repeated at other vertices until the surface mesh model is manifold (decision block 212), at which point a repaired surface mesh model 16 may be output.

Optionally, the surface mesh model repair process also identifies non-manifold triangular facets and removes them from the surface mesh model. As with the identification of hole edges, the identification of non-manifold triangular facets utilizes triangle counts. A triangular facet is likely to be non-manifold, and thus should be removed from the surface mesh model, if it has two edges with triangle counts greater than two or one edge with a triangle count greater than two and two edges with a triangle count of one. It is also contemplated that a triangular facet may be identified as non-manifold and removed if any one of its edges has a triangle count greater than two. In some implementations of the process described herein, the steps of identifying and removing non-manifold triangular facets occurs at the start of the algorithm.

It may also be desirable to filter duplicate vertices out of the surface mesh model, preferably prior to identifying and discarding non-manifold triangular facets, filling holes, and repairing "pinched" vertices. For any selected vertex (also referred to as an "existing vertex"), the term "duplicate vertex" refers to a vertex that is closer than a preset small distance to the selected vertex. In some embodiments of the invention, the preset small distance may be expressed as a multiple of machine epsilon, such as about 1000 times machine epsilon. Triangular facets including one or more duplicate vertices are preferably redefined to substitute existing vertices for duplicate vertices, thereby merging the duplicate vertices with the existing vertices.

Filtering of duplicate vertices, and in particular the redefinition of triangular facets to include existing vertices instead of duplicate vertices, may introduce "degenerate facets" into the surface mesh model. A "degenerate facet" is a facet that is initially defined by both a duplicate vertex and an existing vertex such that, when the duplicate vertex is replaced by the existing vertex according to the process described above, the triangular facet no longer includes three unique vertices. For example, suppose a triangular facet F is defined by vertices (k, l, l'), where vertex l' is closer than the preset small distance to vertex l. Thus, vertex l' is a duplicate vertex to selected vertex l. Vertex l' is replaced by vertex l in the definition of triangular facet F, converting triangular facet F to a degenerate facet (k, l, l). Degenerate facets are preferably discarded from the surface mesh model prior to repairing the surface mesh model to be substantially watertight.

Figure 10A:
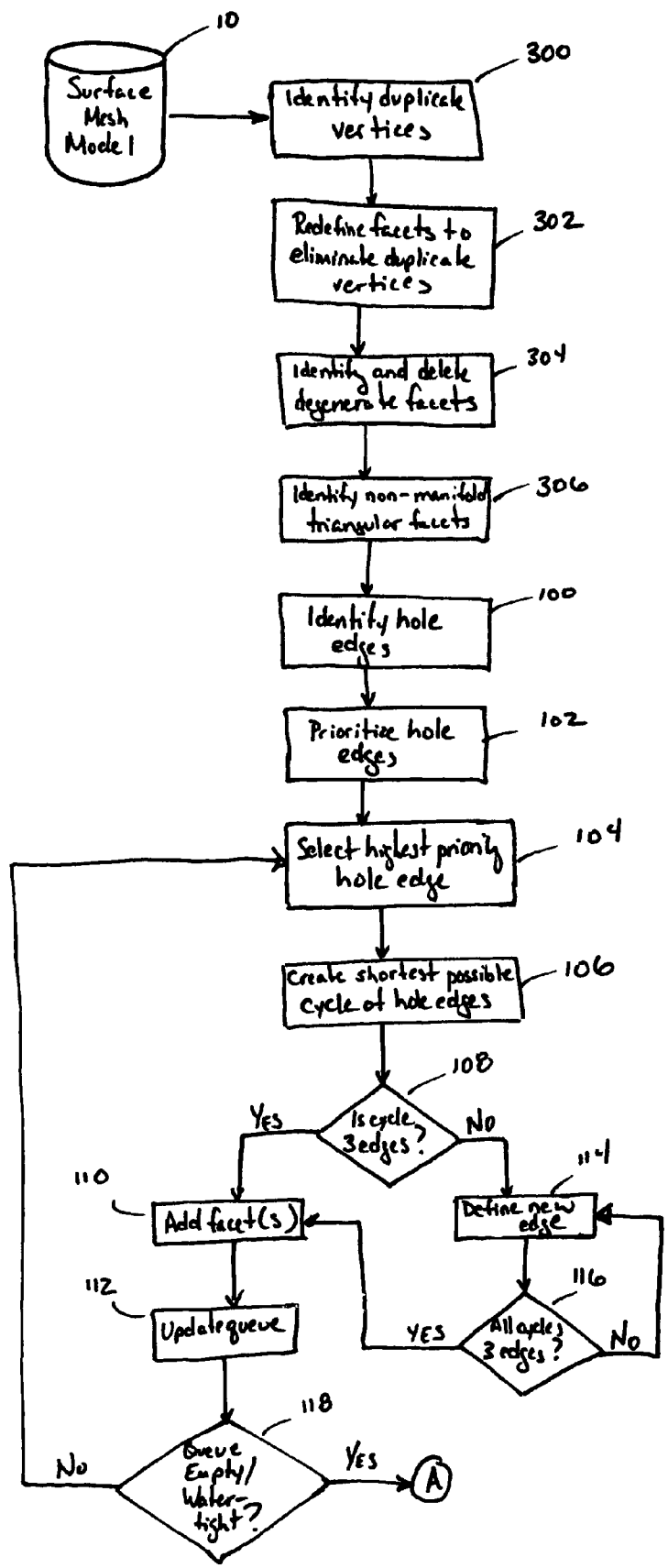
FIGS. 10a and 10b are, collectively, a flowchart illustrating a method of repairing a surface mesh model to be watertight, manifold, and free of duplicate vertices and degenerate facets.
Figure 10B:
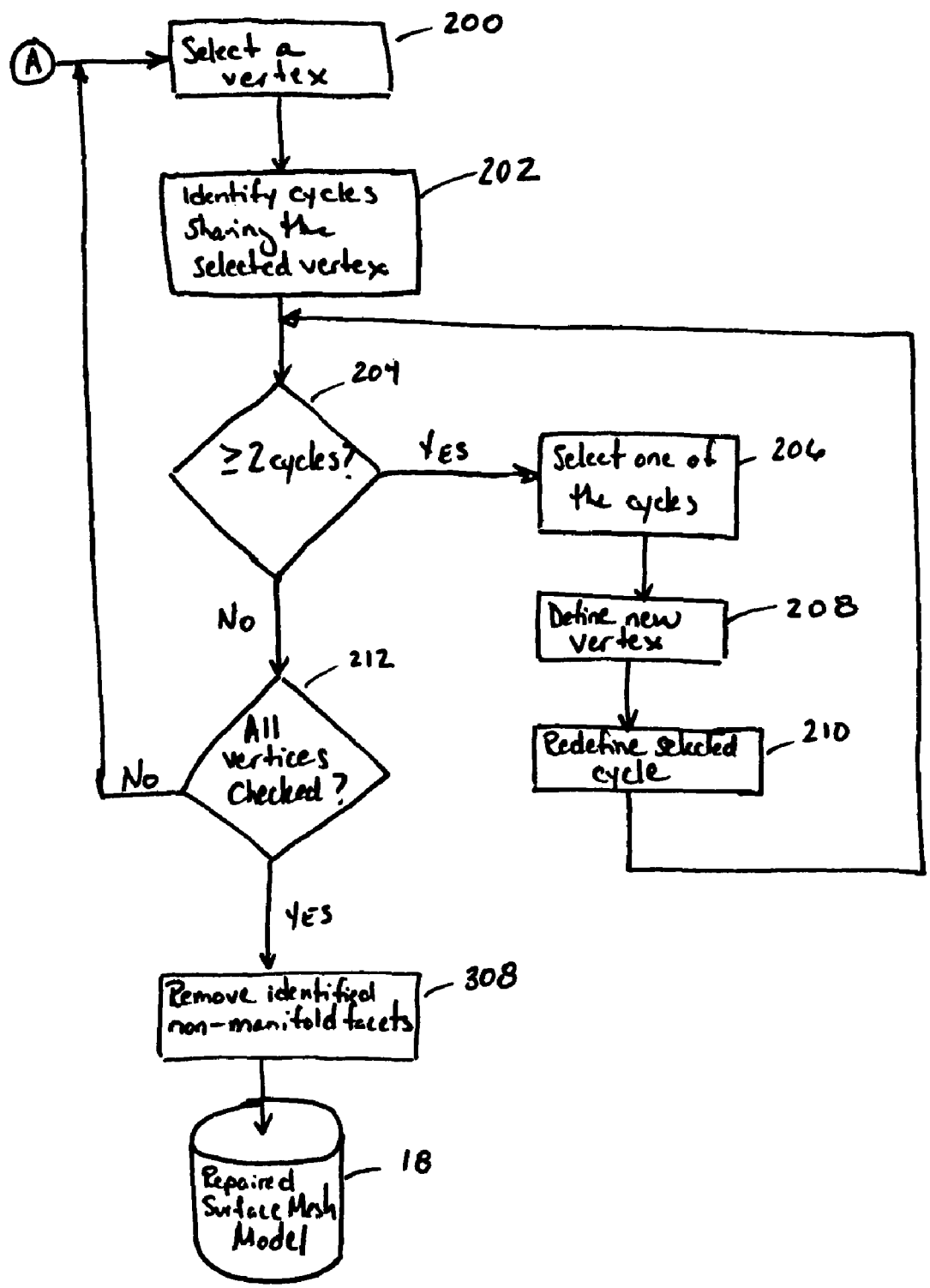

FIGS. 10a and 10b are, collectively, a flowchart illustrating a method of repairing surface mesh model 10 to be both watertight and manifold including removal of non-manifold facets and filtering of duplicate vertices. The method begins with the input of surface mesh model 10 to a process 300 that identifies duplicate vertices as described above (e.g., by detecting vertices that are within a preset small distance, such as a multiple of machine epsilon, to a selected vertex). In step 302, triangular facets defined by one or more duplicate vertices are redefined to be defined by the corresponding selected vertices, thereby merging the duplicate vertices with the selected vertices. Any resulting degenerate facets may be identified and deleted in step 304.

Process 306 then identifies and/or flags non-manifold triangular facets according to the criteria discussed above (e.g., two edges with triangle counts greater than two, one edge with a triangle count greater than two and two edges with a triangle count of one, or one edge with a triangle count greater than two). Once process 306 has identified and/or flagged any non-manifold triangular facets, process 100 identifies hole edges within the surface mesh model, and, as shown in FIGS. 10a and 10b, the process proceeds generally as described above in connection with FIGS. 8 and 9 to repair surface mesh model 10 to be watertight and manifold at each vertex. Once surface mesh model 10 is substantially watertight and the edge queue is empty, as verified by decision block 118, and all vertices have been made manifold, as verified by decision block 212, process 308 removes the non-manifold triangular facets identified by process 306 from the surface mesh model and outputs a repaired surface model 18 that is substantially watertight, manifold at each vertex and facet, and preferably free of degenerate facets.

The methods described above may be executed by one or more computer systems, and may be software implemented (e.g., one or more software programs executed by one or more computer systems of processors), hardware implemented (e.g., a series of instructions stored in one or more solid state devices), or a combination of both. The computer may be a conventional general purpose computer, a special purpose computer, a distributed computer, or any other type of computer. Further, the computer may comprise one or more processors, such as a single central processing unit or a plurality of processing units, commonly referred to as a parallel processing environment. The term "processor" as used herein refers to a computer microprocessor and/or a software program (e.g., a software module or separate program) that is designed to be executed by one or more microprocessors running on one or more computer systems. For example, a system for filling holes in a surface mesh model may include a hole identification processor to identify a cycle of hole edges that defines a hole in the surface mesh model, and a facet fabrication processor to fabricate new triangular facets to fill the hole. Similarly, a system for repairing non-manifold vertices of a surface mesh model may include a vertex checking processor configured to determine a number of independent cycles of triangular facets sharing a selected vertex and a vertex redefinition processor configured to redefine the selected vertex for at least all but one of the cycles.

Figure 8:
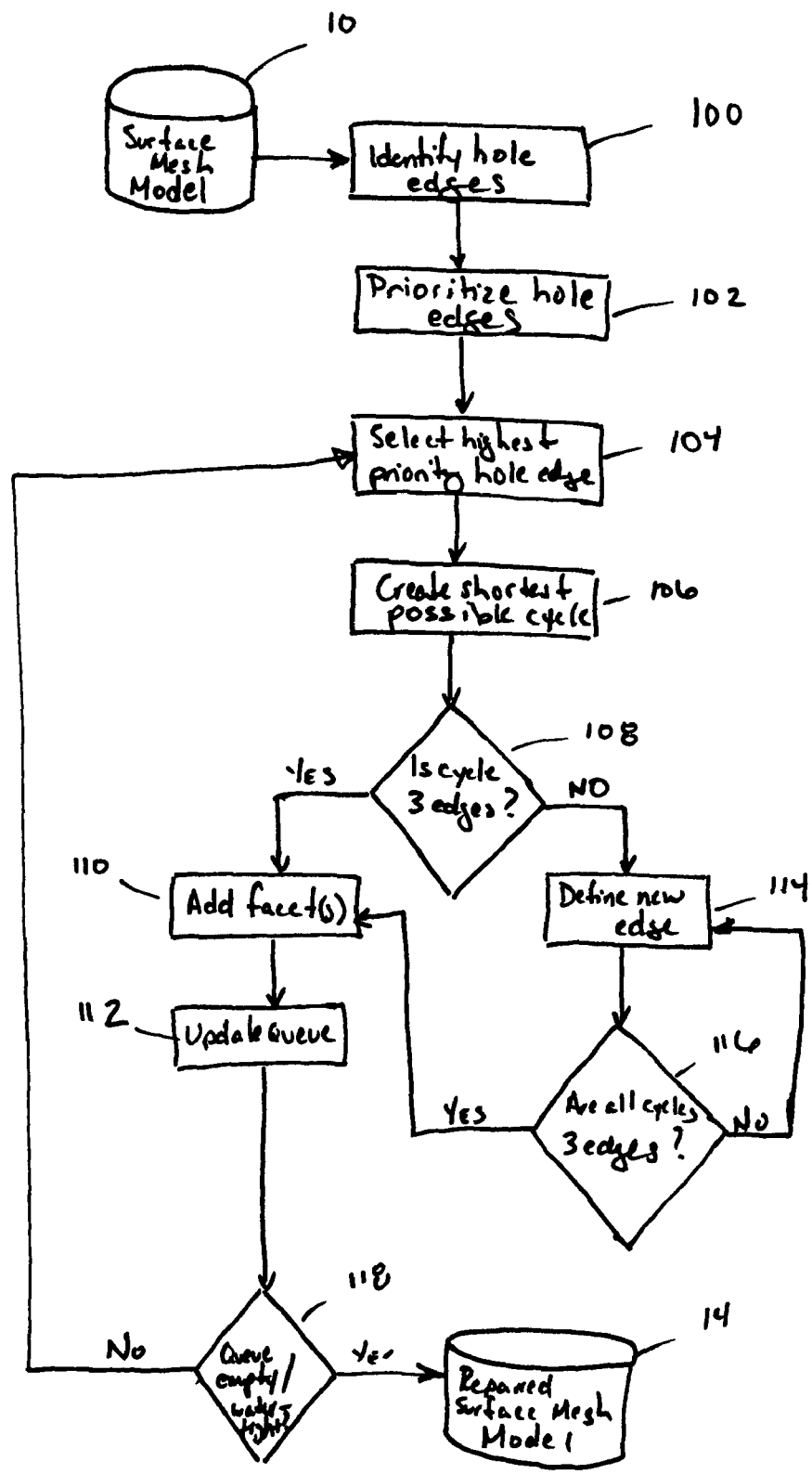
FIG. 8 is a flowchart illustrating a method of filling holes in a surface mesh model.

By way of further example, each of the processes and decisions identified in FIGS. 8-10 can be implemented using one or more computer processors running on one or more computer systems, thereby establishing a computerized system and method for the present invention.

Although only a few embodiments of this invention have been described above with a certain degree of particularity, those skilled in the art could make numerous alterations to the disclosed embodiments without departing from the spirit or scope of this invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of using one or more computer processors running on one or more computer system to repair a surface mesh model including a plurality of triangular facets, the method comprising:
   obtaining a surface mesh model for a three dimensional object comprising a plurality of triangular facets, each of the facets being defined by three edges that connect three vertices;
   identifying a hole in the surface mesh model, the hole being defined by a plurality of hole edges;
   determining a plurality of hole vertices that define the plurality of hole edges that define the hole;
   filling the hole using a plurality of triangular facets, comprising:
   selecting a pair of the hole vertices, wherein the selected pair of the hole vertices is not connected by a hole edge;

defining a fabricated edge connecting the selected pair of the hole vertices; and checking to see if one or more triangles are formed using the newly defined fabricated edge, and if so, defining the newly formed one or more triangles as one or more new triangular facets, and adding the one or more new triangular facets to the plurality of triangular facets of the surface mesh model.

2. The method according to claim 1, wherein the step of filling the hole using a plurality of triangular facets further comprises:

if one or more triangles are not formed, continuing to define fabricated edges until one or more triangles are formed, and defining the newly formed one or more triangles as one or more new triangular facets, and adding the one or more new triangular facets to the plurality of triangular facets of the surface mesh model.

3. The method according to claim 1, wherein the step of selecting a pair of the hole vertices comprises selecting a closest pair of the hole vertices.

4. The method according to claim 1, wherein the step of selecting a pair of the hole vertices comprises:

locating a smallest interior angle of the plurality of hole edges that define the hole; and selecting a pair of the hole vertices that define a pair of the plurality of hole edges that intersect at the smallest interior angle of the plurality of hole edges that define the hole.

5. The method according to claim 1, further comprising repeating the steps of identifying a hole in the surface mesh model, determining a plurality of hole vertices that define the plurality of hole edges that define the hole, and filling the hole using a plurality of triangular facets until the surface mesh model is substantially watertight.

6. A method of using one or more computer processors running on one or more computer system to repair a surface mesh model including a plurality of triangular facets, the method comprising:

obtaining a three dimensional surface mesh model for a three dimensional object comprising a plurality of triangular facets, each of the triangular facets being defined by three edges that connect three vertices;

identifying a plurality of hole edges in the surface mesh model;

selecting one of the plurality of hole edges;

creating a cycle of hole edges that define a hole in the surface mesh model, wherein the cycle of hole edges includes the selected one of the plurality of hole edges;

converting the cycle of hole edges into two or more cycles of exactly three edges, each of the two or more cycles of exactly three edges including at least one of the plurality of hole edges, thereby defining a plurality of hole-filling triangles; and adding a triangular facet to the surface mesh model for each of the plurality of hole-filling triangles.

7. The method according to claim 6, wherein the step of selecting one of the plurality of hole edges comprises:

creating a prioritized queue of hole edges using triangle counts for each hole edge in the queue, assigning a higher priority to any hole edge having a triangle count less than two, and assigning a lower priority to any hole edge having a triangle count greater than two; and selecting one of the plurality of hole edges from the prioritized queue of hole edges in accordance with the assigned priority.

8. The method according to claim 6, wherein the step of creating a cycle of hole edges that define a hole in the surface mesh model comprises creating a shortest possible cycle of hole edges including the selected hole edge.

9. The method according to claim 6, wherein the step of converting the cycle of hole edges into two or more cycles comprises defining one or more fabricated edges connecting non-neighboring vertices of the cycle of hole edges.

10. The method according to claim 9, wherein the step of defining one or more fabricated edges connecting non-neighboring vertices of the cycle of hole edges comprises:

a) identifying a closest pair of non-neighboring vertices of the cycle of hole edges; and b) defining a fabricated edge connecting the closest pair of non-neighboring vertices of the cycle of hole edges, thereby splitting the cycle of hole edges into two cycles of edges.

11. The method according to claim 10, further comprising repeating steps a) and b) for at least one of the two cycles of edges into which the cycle of hole edges was split.

12. The method according to claim 10, further comprising iteratively repeating steps a) and b) until the cycle of hole edges is converted into two or more cycles of exactly three edges.

13. The method according to claim 9, wherein the step of defining one or more fabricated edges connecting non-neighboring vertices of the cycle of hole edges comprises:

a) identifying a smallest interior angle of the cycle of hole edges; and b) defining a fabricated edge that completes a triangle with a pair of hole edges that intersect at the smallest interior angle of the cycle of hole edges, thereby splitting the cycle of hole edges into two cycles of edges, at least one of which has exactly three edges.

14. The method according to claim 13, further comprising repeating steps a) and b) for at least one of the two cycles of edges into which the cycle of hole edges was split.

15. The method according to claim 13, further comprising iteratively repeating steps a) and b) until the cycle of hole edges is converted into two or more cycles of exactly three edges.

16. The method according to claim 6, further comprising orienting the plurality of triangular facets comprising the surface mesh model by listing the vertices of each triangular facet in a counterclockwise order when viewed from outside the three dimensional mesh surface.

17. The method according to claim 6, further comprising orienting the plurality of triangular facets comprising the surface mesh model by listing the vertices of each triangular facet in an order such that any two of the plurality of triangular facets having a shared edge list the vertices defining the shared edge in opposite orders.

18. The method according to claim 6, further comprising:

identifying one or more non-manifold triangular facets of the plurality of triangular facets; and removing the identified one or more non-manifold triangular facets from the plurality of triangular facets.

19. The method according to claim 18, wherein the step of identifying one or more non-manifold triangular facets of the plurality of triangular facets comprises identifying one or more triangular facets of the plurality of triangular facets having two edges with a triangle count greater than two.

20. The method according to claim 18, wherein the step of identifying one or more non-manifold triangular facets of the plurality of triangular facets comprises identifying one or more triangular facets of the plurality of triangular facets having one edge with a triangle count greater than two and two edges with a triangle count of one.

21. The method according to claim 18, wherein the step of identifying one or more non-manifold triangular facets of the plurality of triangular facets comprises identifying one or more triangular facets of the plurality of triangular facets having one edge with a triangle count greater than two.

22. The method according to claim 6, further comprising filtering the surface mesh model to eliminate one or more duplicate vertices.

23. The method according to claim 22, wherein the step of filtering the surface mesh model to eliminate one or more duplicate vertices comprises:
   selecting an existing vertex of one of the plurality of triangular facets;
   analyzing a plurality of vertices of the plurality of triangular facets to identify one or more duplicate vertices closer than a preset distance to the selected existing vertex; and
   redefining one or more of the plurality of triangular facets defined by one or more duplicate vertices to be defined by the selected existing vertex rather than the identified one or more duplicate vertices.

24. The method according to claim 23, wherein the preset distance is defined as a multiple of machine epsilon.

25. The method according to claim 23, further comprising:
   identifying one or more degenerate triangular facets of the plurality of triangular facets; and
   removing the identified one or more degenerate triangular facets from the plurality of triangular facets.

26. A method of using one or more computer processors running on one or more computer system to repair a surface mesh model of a three dimensional object including a plurality of triangular facets to be substantially both watertight and manifold, the method comprising:
   a) identifying a plurality of hole edges in the surface mesh model;
   b) arranging the plurality of hole edges in an edge queue from a highest priority hole edge to a lowest priority hole edge, wherein a hole edge having a triangle count less than two has a higher priority than a hole edge having a triangle count greater than two;
   c) selecting the highest priority hole edge within the edge queue;
   d) determining a cycle of hole edges including the selected hole edge;
   e) converting the cycle of hole edges to one or more fabricated triangular facets; and
   f) adding the one or more fabricated triangular facets to the surface mesh model.

27. The method according to claim 26, further comprising:
   g) updating the edge queue.

28. The method according to claim 27, further comprising repeating steps c), d), e), f), and g) until the edge queue is empty.

29. The method according to claim 26, wherein the step of converting the cycle of hole edges to one or more fabricated triangular facets comprises:
   defining a fabricated triangular facet corresponding to the cycle of hole edges when the cycle of hole edges contains exactly three hole edges; and
   splitting the cycle of hole edges into two or more cycles of exactly three edges and defining two or more corresponding fabricated triangular facets when the cycle of hole edges contains four or more hole edges.

30. The method according to claim 29, wherein the step of splitting the cycle of hole edges into two or more cycles of exactly three edges comprises defining n fabricated edges connecting non-neighboring vertices of the cycle of hole edges, n being given by an equation n=s−3, wherein the cycle of hole edges includes s hole edges.

31. The method according to claim 26, further comprising:
   selecting a vertex of one of the plurality of triangular facets;
   determining a number of independent cycles of triangular facets sharing the selected vertex; and
   if the number of independent cycles of triangular facets sharing the selected vertex is two or more, redefining the selected vertex for at least one of the two or more independent cycles of triangular facets sharing the selected vertex.

32. The method according to claim 31, wherein the step of redefining the selected vertex comprises:
   g) selecting one of the two or more independent cycles of triangular facets sharing the selected vertex;
   h) defining a new vertex a short distance from the selected vertex in a direction normal to and towards the selected independent cycle of triangular facets; and
   i) redefining the selected independent cycle of triangular facets to share the new vertex rather than the selected vertex.

33. The method according to claim 32, further comprising repeating steps g), h), and i) for at least all but one of the two or more independent cycles of triangular facets sharing the selected vertex.

34. The method according to claim 26, further comprising removing one or more non-manifold triangular facets from the surface mesh model, each of the one or more non-manifold triangular facets meeting one of the following criteria:
   one edge having a triangle count greater than two;
   two edges having triangle counts greater than two; or
   one edge having a triangle count greater than two and two edges having triangle counts equal to one.

35. A method of using one or more computer processors running on one or more computer system to repair a surface mesh model of a three dimensional object including a plurality of triangular facets, the method comprising:
   creating a cycle of hole edges having s edges, wherein s is greater than or equal to three, the cycle of hole edges defining a hole in the surface mesh model;
   defining n fabricated edges connecting non-neighboring vertices of the cycle of hole edges, wherein n=s−3, such that the hole in the surface mesh model is defined by (n+1) cycles of exactly three edges each; and
   adding a triangular facet to the surface mesh model for each of the (n+1) cycles of exactly three hole edges defining the hole in the surface mesh model.

36. The method according to claim 35, further comprising repeating the steps of creating a cycle of hole edges having s edges, defining n fabricated edges connecting non-neighboring vertices of the cycle of hole edges, and adding a triangular facet to the surface mesh model for each of the (n+1) cycles of exactly three edges until the surface mesh model is watertight.

37. A method of using one or more computer processors running on one or more computer system to repair a surface mesh model including a plurality of triangular facets, the method comprising:
   obtaining a three dimensional surface mesh model of a three dimensional object comprising a plurality of triangular facets, each of the triangular facets being defined by three edges that connect three vertices;
   selecting a vertex of one of the plurality of triangular facets;
   identifying a subset of the plurality of triangular facets including the selected vertex;

creating a cycle of triangular facets from the subset of the plurality of triangular facets; and redefining the selected vertex for all triangular facets in the cycle of triangular facets if every triangular facet within the subset of the plurality of triangular facets is not included in the cycle of triangular facets.

38. The method according to claim 37, wherein the step of redefining the selected vertex for all triangular facets in the cycle of triangular facets comprises:

defining a new vertex a short distance from the selected vertex; and redefining all triangular facets in the cycle of triangular facets to include the new vertex instead of the selected vertex.

39. The method according to claim 38, wherein the step of defining a new vertex a short distance from the selected vertex comprises defining the new vertex a short distance from the selected vertex in a direction normal to and towards the cycle of triangular facets.

40. The method according to claim 37, further comprising repeating the steps of identifying a subset of the plurality of triangular facets including the selected vertex, creating a cycle of triangular facets from the subset of the plurality of triangular facets, and redefining the selected vertex for all triangular facets in the cycle of triangular facets if every triangular facet within the subset of the plurality of triangular facets is not included in the cycle of triangular facets until the surface mesh model is manifold at the selected vertex.

41. A system for repairing a surface mesh model for a three dimensional object, the surface mesh model including a plurality of triangular facets, the system comprising:

a hole identification processor configured to identify a cycle of hole edges that defines a hole in the surface mesh model, the cycle of hole edges being defined by three or more vertices; and a facet fabrication processor configured to fabricate one or more triangular facets that fill the hole in the surface mesh model by interconnecting the three or more vertices of the cycle of hole edges.

42. The system according to claim 41, wherein the hole identification processor is configured to identify a shortest possible cycle of hole edges that defines a hole in the surface mesh model.

43. The system according to claim 41, wherein the facet fabrication processor fabricates one or more triangular facets that fill the hole in the surface mesh model by:

defining a fabricated triangular facet corresponding to the cycle of hole edges when the cycle of hole edges contains exactly three hole edges defined by exactly three vertices; and splitting the cycle of hole edges into two or more cycles of exactly three edges and defining two or more corresponding fabricated triangular facets when the cycle of hole edges contains four or more hole edges defined by four or more vertices.

44. The system according to claim 43, wherein the facet fabrication processor splits the cycle of hole edges into two or more cycles of exactly three hole edges by defining n fabricated edges interconnecting non-neighboring vertices of the cycle of hole edges, n being given by an equation $n=s-3$, wherein the cycle of hole edges includes s hole edges.

45. The system according to claim 41, further comprising a facet checking processor configured to identify and discard one or more non-manifold triangular facets of the plurality of triangular facets.

46. The system according to claim 45, wherein each of the one or more non-manifold triangular facets meets one of the following criteria:

one edge having a triangle count greater than two;

two edges having triangle counts greater than two; or one edge having a triangle count greater than two and two edges having triangle counts equal to one.

* * * * *